United States Patent [19]

Boots

[11] 4,145,980
[45] Mar. 27, 1979

[54] SEEDER FOR PLANTING SEEDS AT PRECISE INTERVALS

[75] Inventor: Vernie A. Boots, Belle Glade, Fla.

[73] Assignee: A. Duda and Sons Inc., Oviedo, Fla.

[21] Appl. No.: 747,875

[22] Filed: Dec. 6, 1976

[51] Int. Cl.² .............................................. A01C 5/00
[52] U.S. Cl. ...................................... 111/1; 111/10; 111/34; 111/77; 111/81; 111/85; 172/4
[58] Field of Search .................... 172/4; 221/211; 37/DIG. 20; 111/1, 6, 7, 52, 53, 59, 61, 77, 85, 81, 10, 11, 12, 13, 80, 34, 8, 9; 239/150, 155, 176; 118/323; 47/1.43, 1.7

[56] References Cited

U.S. PATENT DOCUMENTS

| 2,869,490 | 1/1959 | Huber et al. ............................ 111/80 |
| 2,888,890 | 6/1959 | Baptista ................................... 111/7 |
| 3,142,274 | 7/1964 | Winter .................................... 111/34 |
| 3,516,182 | 6/1970 | Wykert ........................... 37/DIG. 20 |
| 3,559,599 | 2/1971 | Hoadlay ................................. 111/85 |
| 3,610,185 | 10/1971 | Scarborough ........................ 111/85 |
| 3,638,393 | 2/1972 | Datta ...................................... 53/180 |
| 3,698,332 | 10/1972 | McCallum ............................ 111/77 |
| 3,705,560 | 12/1972 | Lappin .................................... 111/85 |
| 3,744,441 | 7/1973 | Smith et al. .......................... 111/7 |
| 3,749,035 | 7/1973 | Cayton et al. ......................... 172/4 |
| 3,770,164 | 11/1973 | Hembree .............................. 221/211 |
| 3,844,357 | 10/1974 | Ellinger ................................. 172/4 |
| 3,848,552 | 11/1974 | Bauman et al. ...................... 111/77 |
| 3,995,569 | 12/1976 | Picardat ................................ 111/6 |

FOREIGN PATENT DOCUMENTS

| 91940 | 10/1961 | Denmark ............................... 111/77 |
| 25751 | 2/1884 | Fed. Rep. of Germany ............. 111/14 |
| 1285288 | 1/1962 | France .................................... 111/59 |
| 1503687 | 10/1967 | France .................................... 111/77 |
| 6407284 | 12/1965 | Netherlands ......................... 221/211 |
| 19410 of | 1891 | United Kingdom ................... 172/4 |

Primary Examiner—Edgar S. Burr
Assistant Examiner—James R. Feyrer
Attorney, Agent, or Firm—Julian C. Renfro

[57] ABSTRACT

An automatic seeder for planting tiny seeds at a consistent depth and at evenly spaced intervals, utilizing a vehicle carrying a novel seed dispersing means operationally disposed a short, preascertained distance above a seed bed. A ground sensing arrangement is utilized, which automatically brings about necessary adjustment of the support arrangement for the seed dispersing means on an as-needed basis, in order that the seed dispersing means will be maintained by servo means at a proper, preascertained distance above the ground. A preferred embodiment of this invention involves furrow-creating means located forward of, and aligned with, the seed dispersing means, which furrow-creating means is arranged to create furrows of a consistent, desired depth, into which the seeds from the seed dispersing means are inserted at precisely controlled intervals. A spray arrangement is preferably utilized immediately forward of the seed dispersing means, for wetting the newly-created furrows, thus to eliminate any undesirable tendency of the seeds to bounce. Because of the laying down of the seeds in a precisely controlled manner, the seeds will sprout at equal intervals without any crowding, thus eventually resulting in plants of a consistent size.

28 Claims, 17 Drawing Figures

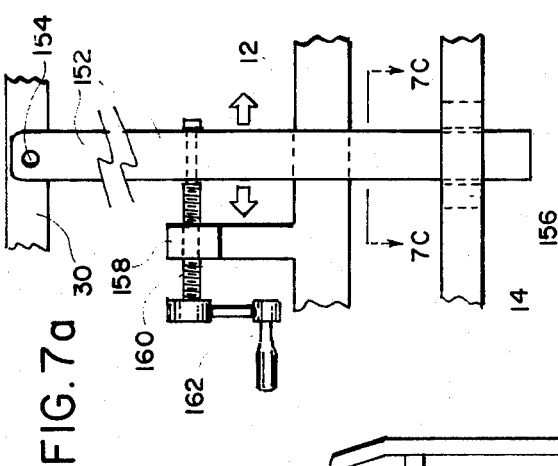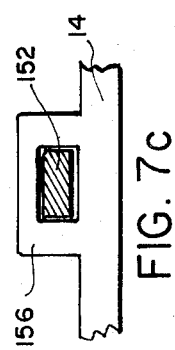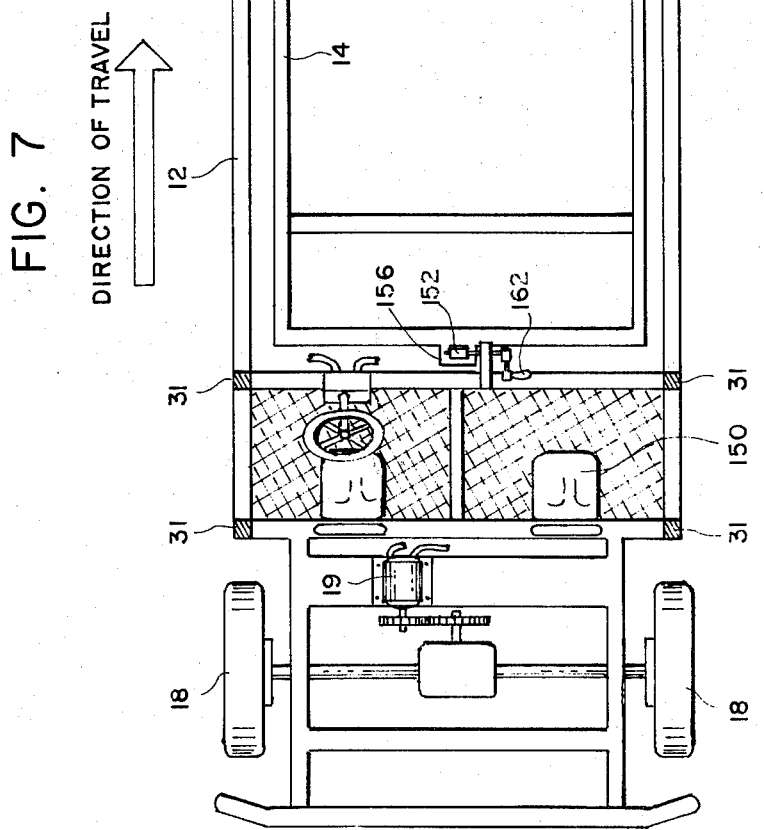

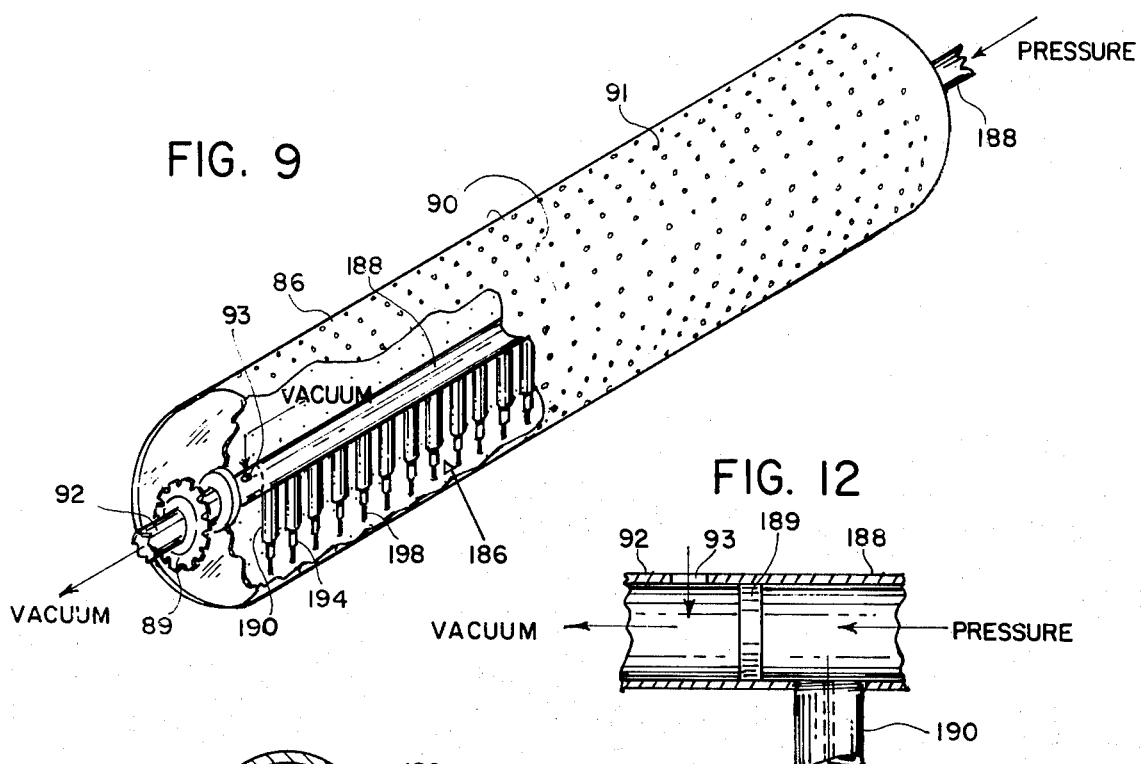
FIG. 9
FIG. 12
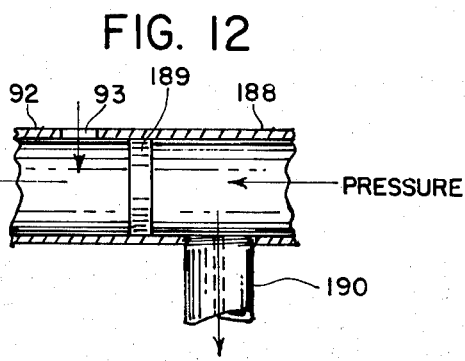
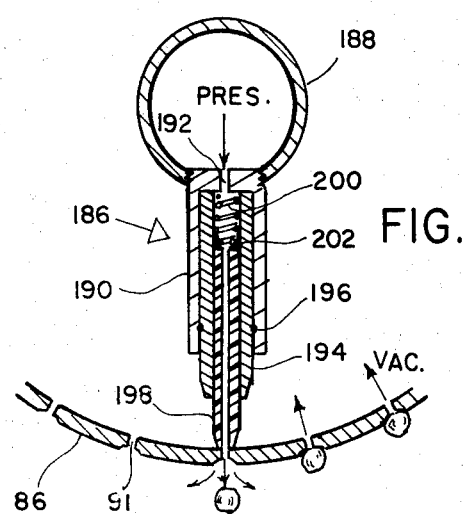
FIG. 11
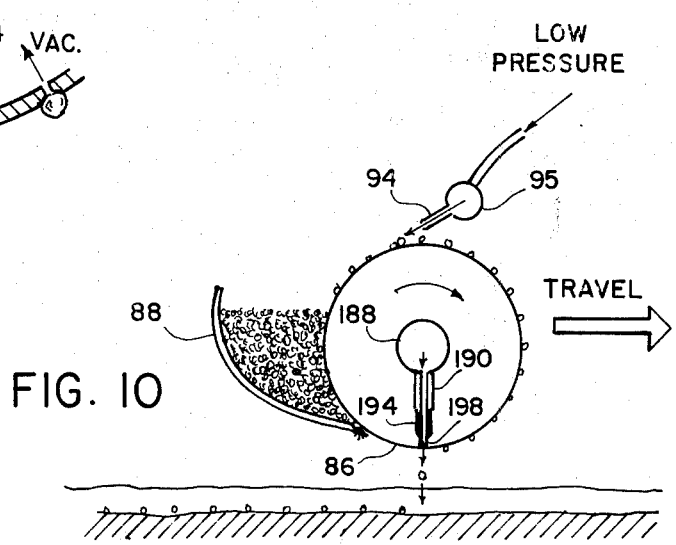
FIG. 10

SEEDER FOR PLANTING SEEDS AT PRECISE INTERVALS

BACKGROUND OF THE INVENTION

In many geographical areas, young celery plants are started in seed beds, sowed in closely spaced relationship in the interest of conserving space. Many advantages accompany the use of seed beds and these include the fact that the young celery plants growing from such seeds can easily be shielded from too much sun by the use of certain open fabric material being arrayed in the manner of a canopy from the tops of poles that are spaced around the periphery of the seed beds. Most importantly, proper moisture control may be relatively easily achieved in seed beds, and also it is possible to use much less fertilizer in such an environment than would have been involved had the plants been started in an open field, with the young plants already spaced in the relationship in which they are ultimately intended to grow.

Celery seeds are quite small, and it has been conventional to build up their size to a standard diameter by a procedure in which controlled amounts of nutrient are applied to the exterior of the seeds. Many machines for dropping the seeds of standardized size at prescribed intervals in seed beds have been proposed, but in all known instances, these machines failed to drop seeds at a consistently even spacing, and furthermore tended to drop the tiny seeds in multiples from time to time. As a result, two, three or more plants often sprouted very close together, resulting in plants that were considerably undersize.

As a consequence of the resulting seedlings being of widely varying size, a considerable amount of "stoop labor" was always necessitated, for someone must work the seed beds very closely, selecting only seedlings of a uniform size for planting, thus to assure that the final celery crop will be sufficiently uniform in size that it can later be harvested by mechanical means.

For many years it has been conventional to then set the selected seedlings out in open fields by the use of large, slow moving machines upon which a number of laborers may work. These laborers sit facing rearwardly, adjacent wheel-like devices that are operationally mounted at above-ground locations, with these devices being caused to rotate in the direction of machine travel, at a speed corresponding to the ground speed of the machine. Various "fingers" are mounted around the periphery of each of these wheels, which fingers are arranged during wheel rotation to come close to the ground. The arrangement is such that each laborer, by working rapidly, can place a seedling between each pair of these "fingers" as the machine travels through the field. The laborers must be dextrous if they are to avoid creating a gap in the particular furrow they are planting, and, as a matter of fact, it is customary to have one or more persons following behind the machine, placing plants in missed spaces.

It is quite obvious that the laborers assigned to place plants in the wheel-like devices have no time to perform any sort of selection with respect to the seedlings they are placing on the wheel-like devices, and therefore in the ground. Accordingly, the laborer responsible for pulling the seedlings out of the seed beds is in effect responsible for the final celery crop being of uniform size. Unfortunately, the plants grown in the seed beds that are passed by as a result of being too large or too small are usually left to wither and die, although this represents a sizable amount of the initial investment of seeds, fertilizer and labor.

To all acquainted with this art, it was obvious that what was needed was an automatic seeder able to plant seeds at such a consistant spacing that plants of extremely uniform size would result, thus making it possible for a seed bed to be stripped only once, instead of it being necessary to strip several times, each time making decisions as to which plants were of proper size.

SUMMARY OF THIS INVENTION

The present invention is the first known device for accomplishing an automatic, precision planting of tiny seeds, with this planting being accomplished at an extremely accurate depth and at a spacing that is carefully predetermined so as to avoid the crowding of tiny plants, and the intertwining of their roots such as might have prevented the plants from achieving a uniform size.

In the preferred embodiment, the planter takes the form of a principal or main frame, preferably self-propelled, with such principal frame carrying a secondary or carrier frame in a manner as to assure that this carrier frame is essentially level with the ground at all times.

A number of components associated with the accurate placement of seeds in the ground are carried by the secondary frame, with this including a scraper, a disk assembly for creating furrows of uniform depth and spacing, a sprinkler means for wetting the newly-created furrows, and a rotating perforate drum having a large number of tiny holes placed at consistent intervals in successive encircling rows or circles that are in alignment with respective furrows. A vacuum or low pressure condition is maintained in the interior of the principal portion of the perforate drum, with this causing seeds carried in a closely adjacent, elongate bin to be picked up, one at each tiny hole. These holes are of small enough size that the seeds are held by vacuum on the surface of the drum at the hole locations, rather than the seeds entering such holes.

The rotary seed drum is maintained at a location slightly above the surface of the ground by servo means, and a vacuum-breaking arrangement is associated with a lower interior portion of the drum such that seeds from each encircling row are caused to be released at their lowermost point of travel, which are of course at locations slightly above respective furrows. Because the distance traveled by each seed subsequent to release is quite small, there is little likelihood of these seeds traveling in irregular paths, so as to end up being spaced at uneven intervals in the furrows.

An important ingredient insofar as assuring the even spacing of seeds in each row is a water spray utilized in accordance with a preferred embodiment of this invention, to wet the furrows immediately prior to the dispersement of the seeds from the perforate drum into the furrows. Extensive experiments have proved that for many soil conditions, if the furrows are dry when the seeds are dropped or projected therein, the seeds will tend to bounce and either take up positions too close to other seeds, or else bounce entirely out of the furrows. I have found that proper wetting of the furrows eliminates this problem entirely.

Another important facet of my invention involves the servo means for maintaining the subframe or carrier frame in a level condition with respect to the ground, such that the rotating disk assembly will create furrows of consistent depth, and the perforate drum will be maintained in such a relationship to the furrows as to produce uniform, consistent results. Although I am not to be limited to the use of hydraulics, in a preferred embodiment I utilize a plurality of actuators associated with the suspension of the subframe from the principal frame, with these actuators being caused to move in directions assuring, on a moment-by-moment basis, the subframe and therefore the disk array and the perforate drum being maintained at precisely accurate distances above the ground. In the aforementioned exemplary embodiment, I preferably provide a plurality of sensing means in contact with the ground. Any changes in ground contour detected by a sensing means brings about the rotation of a respective cam of preascertained configuration in such a direction as to cause appropriate movement of a hydraulic sense valve utilized for assuring the porting of hydraulic fluid to the proper end of the associated hydraulic actuator concerned with leveling the subframe.

It is to be realized that although some additional equipment is necessarily introduced into my seeder in order to make it possible for the disk array and the perforate drum to be maintained at carefully controlled spacings above the furrows, this more than offsets the considerable complexity associated with prior art seed dropping arrangements, which were in fact rarely able to drop seeds at properly spaced intervals for any period of time.

Other aspects of my invention include a scraper bar that precedes the disk array, in order to assure that the seed bed is flat rather than crowned, with this in turn helping to assure that each disk of the disk array creates a furrow of uniform depth.

The leveling arrangement may include a pair of ground-sensing wheels, one disposed at each of the forward corners of the subframe, and a single, multifingered sensing unit mounted on the rear centerline of the subframe, with the fingers of latter unit being spaced so as to sense ground contours without entering the furrows. A cam and sense valve is associated with each of these ground-contacting units, such that desired height relationships of each part of the subframe with respect to the ground can be automatically brought about by the proper porting of fluid to the several actuators.

Additional aspects may include spray means to at least partially close the furrows subsequent to seeding, which may be followed by a type of mesh drum of lightweight construction that serves to complete the closing of the furrows and an appropriate packing of the earth.

Still other aspects of the invention include guide means serving to maintain the carrier frame in a properly aligned relationship to the main frame throughout all of the height adjustments, with lateral adjustment means being provided at a location at the rear of the frames enabling one of the operators to make any slight alignment type corrections necessary from time to time in order to assure the proper dropping of the seeds into their respective furrows.

It is to be realized that while traveling along a seed bed, some speed variations may occur, despite the operator's best efforts to maintain the wheeled vehicle at an even, consistent speed. To minimize if not eliminate speed changes as a consequential factor in seed spacing, I prefer to utilize a common hydraulic fluid supply for both the propulsion motor (or motors) and the hydraulic motor concerned with driving the seed drum in rotation. Although not all of the fluid used for propulsion passes through the motor used for turning the seed drum, nevertheless the ratio remains constant, such that as the speed of the vehicle increases, the seed drum turns proportionately faster, and as the speed of the vehicle decreases, the seed drum turns proportionately slower. In this way, even seed spacing is assured.

It is therefore a principal object of my invention to provide a precision seeder serving to automatically place tiny seeds in furrows of consistent depth, with the seeds being planted at precisely evenly spaced intervals in the furrows.

It is another object of my invention to provide a seeder for automatically planting seeds at uniform depth and in a uniform spacing such that plants of a uniform size will result.

It is another object of my invention to provide a seeder that will create a number of parallel furrows of consistent depth, and that will assure the placement of seeds in each of such furrows at a one-at-a-time, evenly spaced basis.

It is yet another object of my invention to provide a rotating seeder drum maintained at a carefully spaced distance above a plurality of furrows, from which drum, tiny seeds may be dispersed directly into respective furrows with a uniform, predictable trajectory, such that the seeds will be planted at precisely evenly spaced intervals, thereby resulting in plants of uniform size.

It is still another object to provide an automatic seeder that will create a plurality of parallel furrows of consistent depth, condition the furrows with a spray of water sufficient to wet down the furrows, and then evenly disperse seeds into the furrows, with the wetness of the furrows preventing seed bounce, which would of course destroy the otherwise proper spacing of the seeds.

It is yet still another object of my invention to provide a novel, self-propelled seeder utilizing a rotary perforate drum from which seeds are dropped or projected into parallel furrows of consistent depth, with automatically functioning leveling means serving to assure that the perforate drum is maintained at a consistently close height with respect to the furrows, thus assuring precisely spaced seeds.

It is yet still another object of my seeder invention to provide an automatic levelling means serving to maintain the furrow-creating means in such a relationship to the wheeled main frame as to assure the creation of furrows of even, consistent depth, and so as to maintain the perforate drum at a consistent distance above the furrows, such as will assure a predictable distance for the seeds to drop from the drum into the furrows.

It is yet still another object of my invention to provide a highly effective hydraulic system such that changes in flow rate to the hydraulic propulsion means for the vehicle will be accompanied by changes in flow rate to the hydraulic motor used for driving the seed drum in rotation, thus eliminating changes in speed of travel of the seeder vehicle as a factor in the proper, consistent spacing of seeds.

It is yet still another object of my invention to provide an arrangement for driving the perforate seed drum such that its speed of rotation with respect to the ground can be selectively altered, thus making it possible to increase or decrease the spacing of seeds in a given furrow.

DESCRIPTION OF DRAWINGS

FIG. 7 is a view taken from above in order to illustrate the drive and steering arrangements for the seeder vehicle as well as the primary and secondary frame relationships, with components normally carried by the secondary frame being omitted in the interest of clarity;

FIG. 7a is a fragmentary view of the arrangement used at the rear of the secondary frame in order that its relationship to the main frame can be maintained such that seeds will drop from the seeder drum properly into the intended furrows;

FIG. 7b is a fragmentary view taken at the front of the secondary frame in order to illustrate how it is supported from the main frame, and how relative vertical motion is accommodated;

FIG. 7c is a fragmentary view showing certain detail at the rear of the secondary frame;

FIG. 9 is a view of the perforate rotary cylinder carried by the secondary frame, with a large number of encircling rows of seed-retaining holes revealed thereon, with these rows of holes being aligned with respective disks of the disk array such that seeds dropped from the bottom of the cylinder will properly enter intended furrows;

FIG. 10 is a cross sectional view illustrating how seeds are picked up by the exterior of the rotary cylinder or seed drum from a seed supply, and how excess seeds are blown off the drum such that they will return to the seed supply bin;

FIG. 11 is an enlarged fragmentary view depicting how seeds normally held on the outer surface of the drum are selectively caused by air pressure to fall away from the drum at desired lower locations thereon;

FIG. 12 is an enlarged fragmentary view revealing the manner in which a vacuum condition is maintained in a principal part of the perforate drum, but with positive pressure being provided to certain locations as will cause the proper dropping away of the seeds.

DETAILED DESCRIPTION

Figure 1:
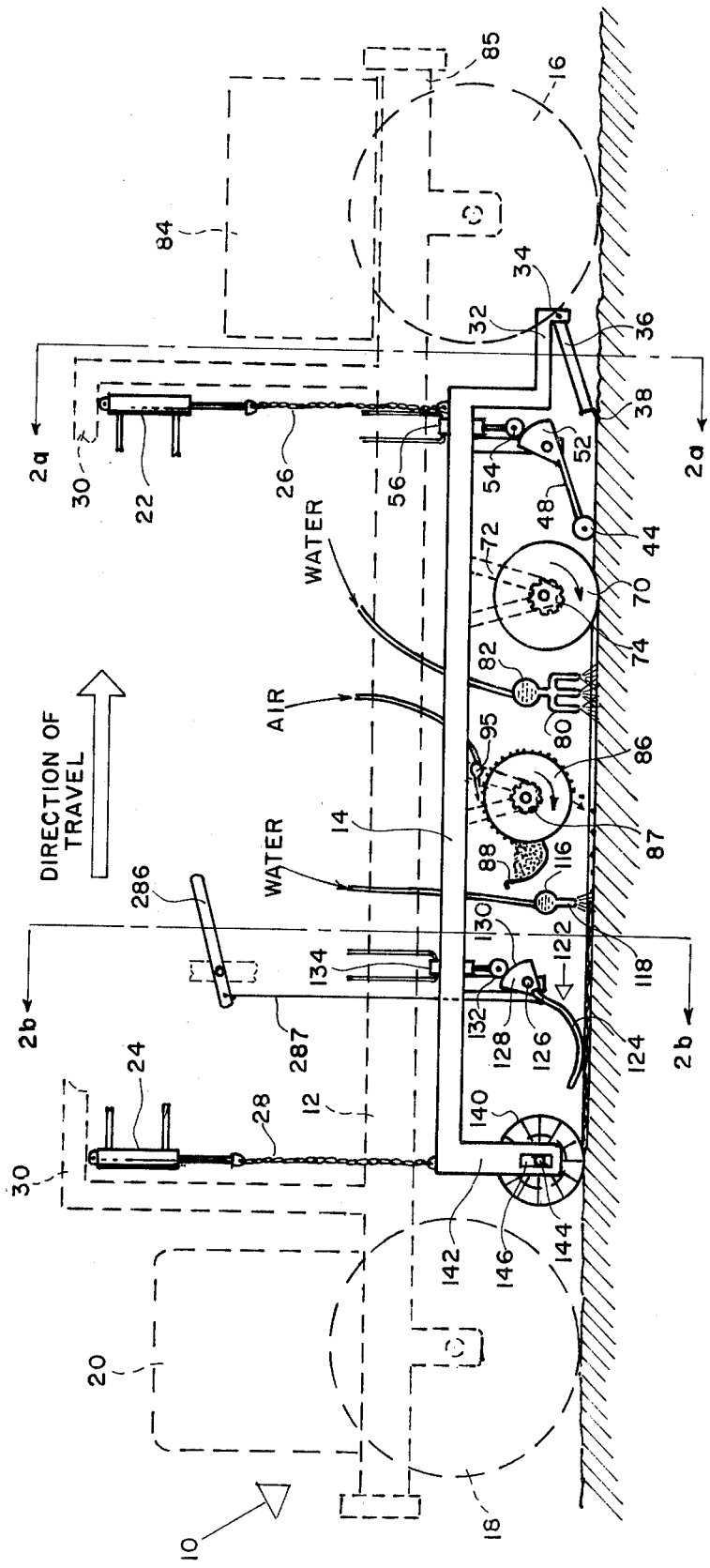
FIG. 1 is a side elevational view of my precision seeder, with the secondary frame and the novel components carried thereby being shown in full lines.

Turning to FIG. 1, a schematic showing the basic operation of my precision seeder 10 is there set forth, which involves a main frame 12 forming the support for a vertically movable carrier frame 14. The main frame is supported by four wheels, with the front wheels 16 being steerable, and the rear wheels 18 forming the principal support for a rear mounted engine 20. The front wheels and the rear wheels are each set a sufficient distance apart as not to disturb the seed beds straddled by the vehicle.

Figure 4:
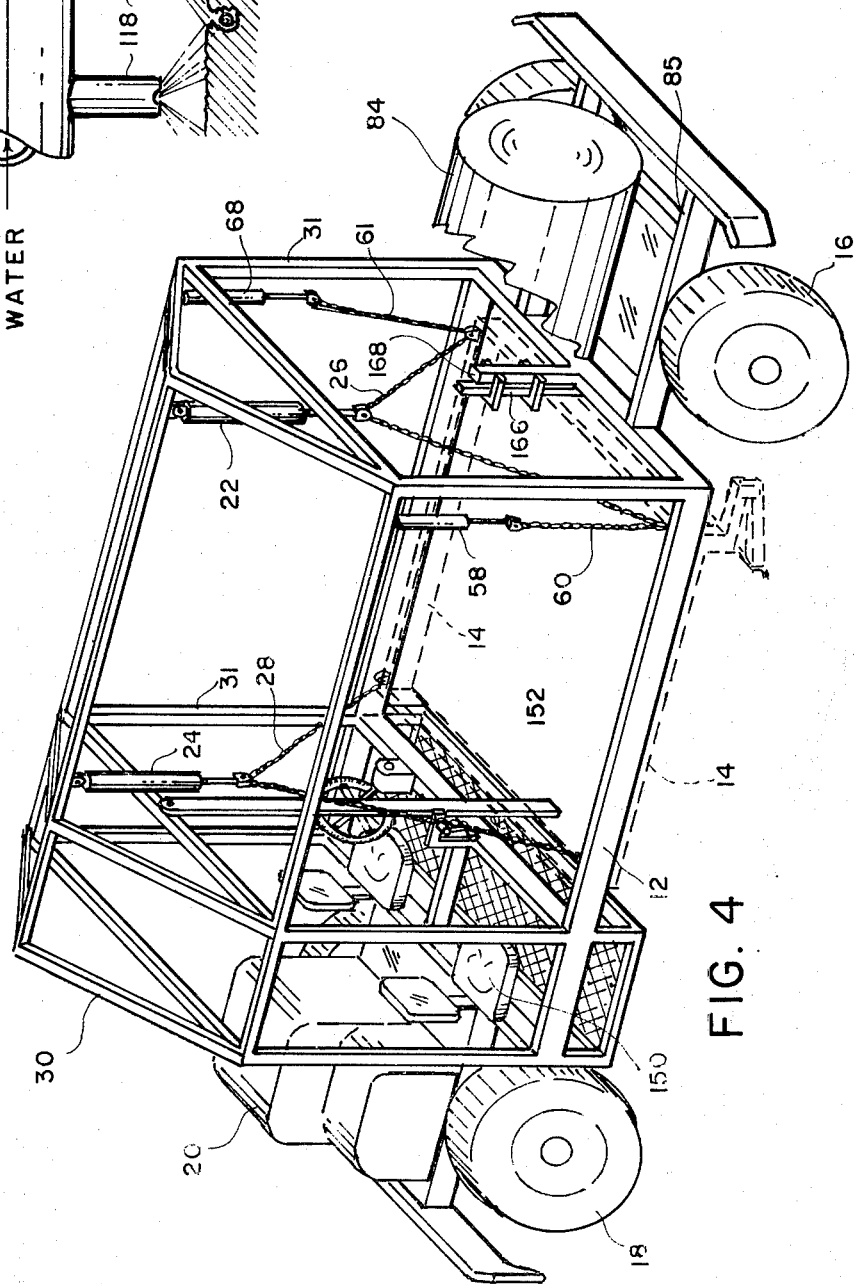
FIG. 4 is a perspective view of the main frame of the seeder device, with particular attention upon the superstructure utilized for carrying the fore and aft actuators, with detail of the secondary or carrier frame omitted.

The movable carrier frame 14 directly forms the support for the active elements of my device, and in order that its height relationship to the ground can be controlled, I provide a front lifting actuator 22 and a rear lifting actuator 24, these preferably being hydraulic devices under the control of the operator. The slidable rod portion of each actuator is attached to a lifting chain arrangement, with a front chain 26 also being attached to the left and right front corners of the carrier frame 14, and a rear chain 28 being attached to the left and right rear corners of the carrier frame; note FIGS. 2a and 2b. The housing portion of each of the actuators is attached to and supported by the superstructure 30 of the seeder device, as shown in FIG. 4.

Figure 3:
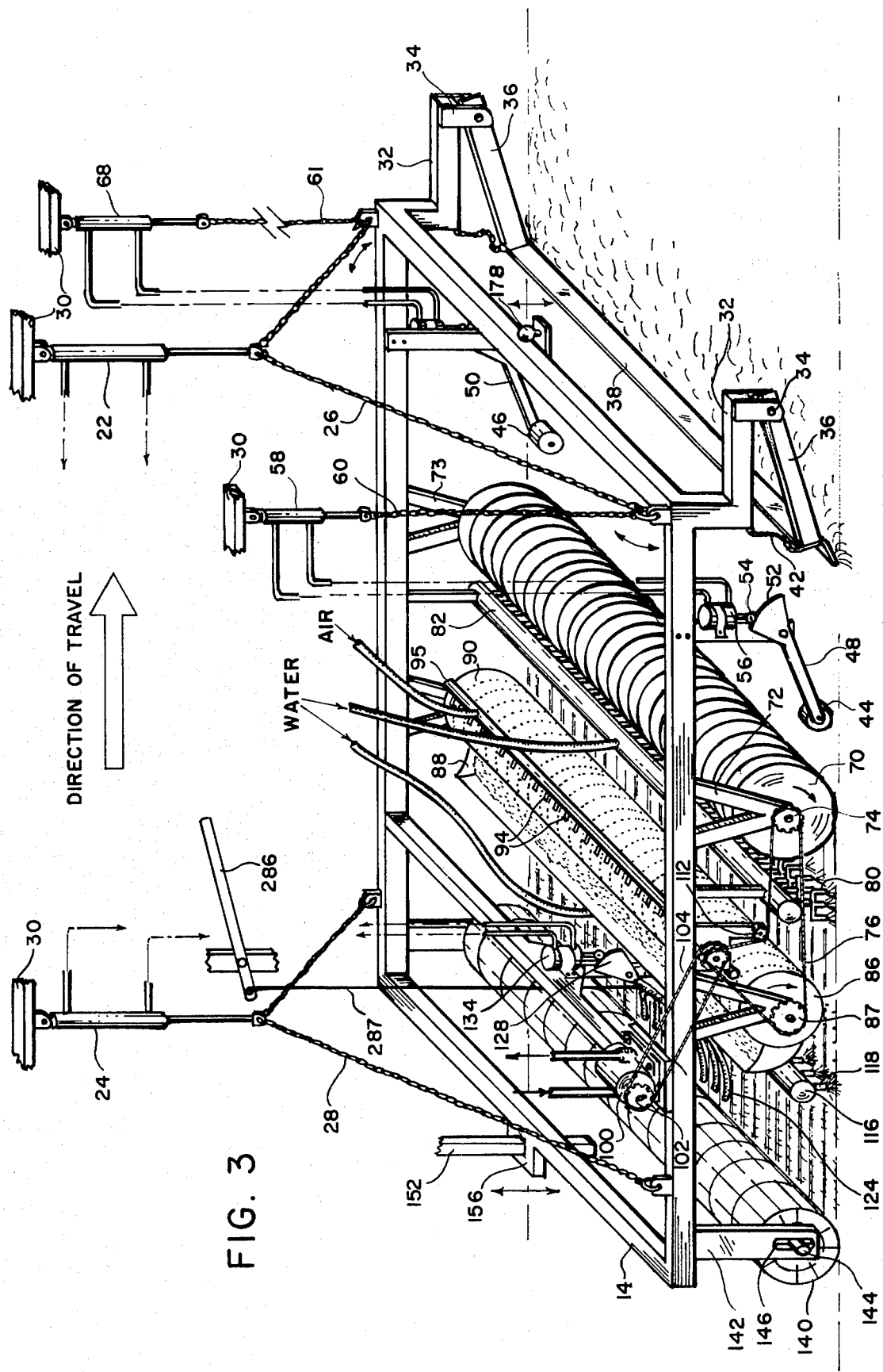
FIG. 3 is a perspective view of the secondary frame when considered apart from the main frame, with this view illustrating the arrangement for driving the disk array and seeder drum in rotation, and the specific placement of the sensors and actator components utilized in order that the fore and aft portions of the secondary frame may be automatically maintained in a level condition at all times during operation of the seeder.

As best seen in FIGS. 1 and 3, a pair of spaced, essentially parallel arms 32 extend rigidly forward for some distance in front of the movable carrier frame 14. A type of hinge joint, such as a clevis 34, is utilized at the forwardmost part of each arm 32, which joint serves as a mounting for a respective movable arm 36. The pair of movable arms 36 support scraper 38 that extends in a left-right sense across the front of the seeder device. The bed to be planted is already basically smooth, and say 54 inches wide. The scraper 38 serves to perform a final smoothing action on the bed, and ordinarily no downward bias in addition to the weight of the device 38 itself needs to be applied. Short chains 42 are used to secure the rear ends of the arms loosely together, with these chains thus serving to prevent the scraper 38 from dropping too far away from the movable frame 14 when latter is lifted away from ground contact by the action of the fore and aft actuators 22 and 24, such as at the end of a row being planted. However, these chains are long enough such that they do not inhibit effective functioning of the scraper along the bed.

As hereinafter explained, servo means is provided to maintain the movable frame 14, or actually certain components carried by the movable frame, at carefully spaced distances above the bed, and to that end, I employ a pair of sense wheels directly behind the scraper 38 in order to perform a leveling operation. Right sense wheel 44 and left sense wheel 46 are respectively mounted on arms 48 and 50 that are pivotally mounted on brackets located on respective front portions of the movable frame 14, with the length of each of these arms being such that the wheels 44 and 46 are in rolling contact with the smoothed upper surface of the bed; note FIGS. 2a and 3.

On the opposite side of the pivot point from the right sense wheel 44 is a cam 52, in close association with which is a cam follower wheel 54. The cam is formed to have a surface that is of substantially constantly increasing radius, so movements of the sense arm about its pivot as a result of changing earth contours brings about a commensurate movement of the cam follower. This in turn brings about movement of the spool valve (not shown) of the right sense valve 56, which causes a proper porting of fluid to the right leveling actuator 58, visible in FIGS. 2a, 3 and 4, which acts via chain 60 in a direction tending to correct the height of the movable frame 14 with respect to the main frame 12, and assure the important components of the frame 14 being maintained at a constant selected distance with respect to the ground.

Similarly, a left cam 62 whose active surface is at a non-constant radius is attached on the other side of the pivot point from the left sense wheel 46 and the left arm 50, with movements of this arm causing movements of left cam 62 such as to cause commensurate movement of the cam follower 64 and therefore movement of the spool valve portion of the left sense valve 66 in the appropriate direction to cause actuation of the left leveling actuator 68 in the desired manner. As is apparent from FIGS. 2a and 3, the left leveling actuator, acting through the chain 61, serves to restore the left side of the frame 14 to the proper height above the bed.

As will be observed from FIGS. 1 and 3, disk assembly 70 is rotatably mounted behind the sense wheels, with this assembly comprising say 25 disks each mounted 2" apart. It is the purpose of these disks to form the parallel, evenly spaced furrows into which the seeds are to be dropped, and I have found this effort is aided by having such disks rotate at a speed two to four times ground speed, or typically three times ground speed.

The disk assembly 70 is mounted below the frame 14 by means of right arms 72 and left arms 73, with a drive sprocket 74 being mounted on the end of the shaft of the disk unit adjacent to the right support arms 72. As seen in FIG. 3, an endless chain 76 passes around sprocket 74, and forms the means for driving the numerous disks in rotation. Further details of the drive arrangement will be set forth shortly.

Figure 2B:
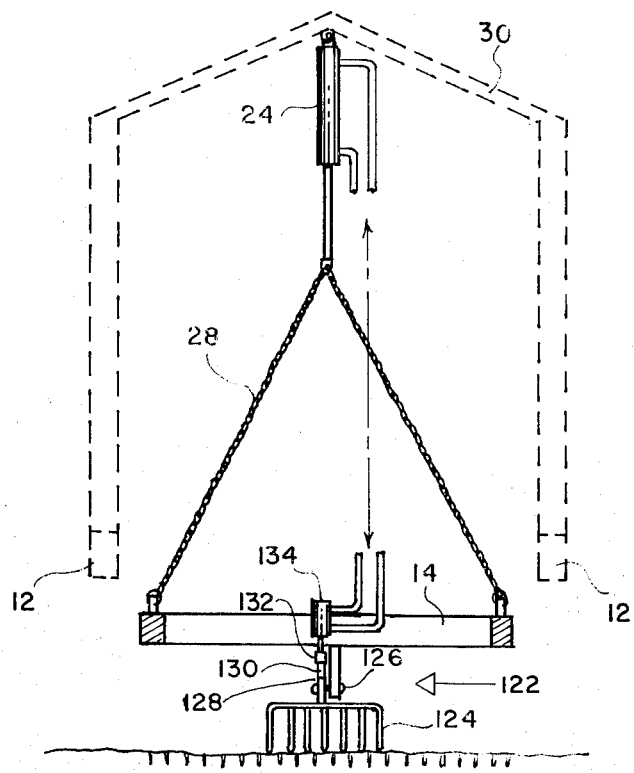
FIG. 2b is a cross-sectional view taken through an aft portion of the seeder device in order to reveal the rear sensor unit and the aft actuator controlled thereby.
Figure 2A:
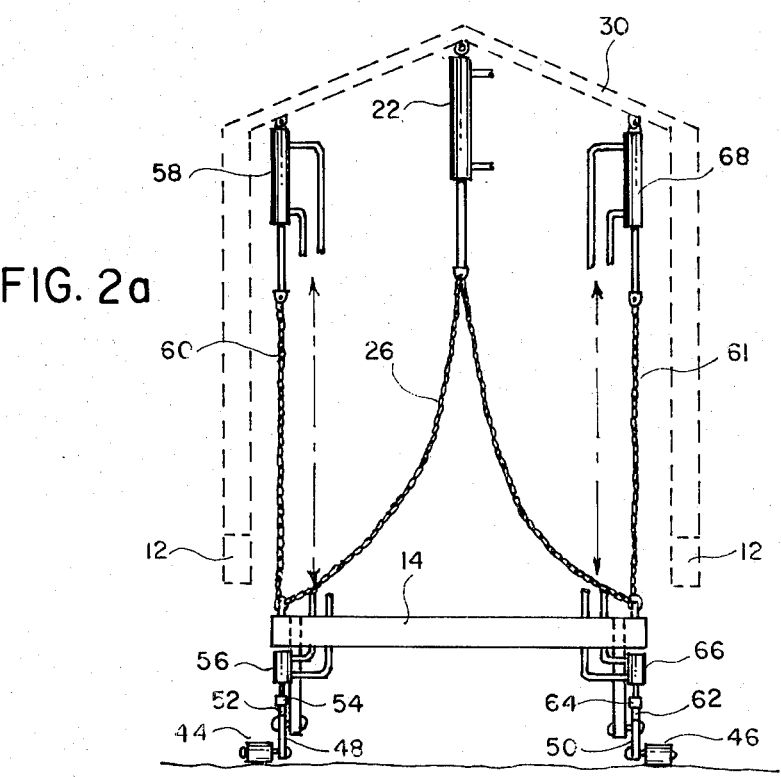
FIG. 2a is a cross-sectional view taken through a forward part of the seeder device as depicted in FIG. 1, in order to reveal certain relationships of the forward sensor units and the leveling actuators controlled thereby.

It is to be noted that the front lifting chain 26 is depicted in FIG. 2a to be in a slack condition, for actuator 22 is concerned with lifting the forward part of the subframe 14 out of contact with the ground on occasion, such as at the end of a row, but it is not concerned with maintaining the subframe in a level operating relationship above the ground. Therefore, the actuator 22 is in a downwardly-extended, out-of-action condition at such time as the sensory wheels 44 and 46 are in contact with the ground and functioning by appropriate cam rotation to cause the actuators 58 and 68 to maintain the movable frame 14 in a lvel operating relationship, in which the disc assembly 70 is serving to create furrows of a consistent, desired depth. The actuators 58 and 68 also effect the positioning of the seed drum 86, but since latter member is approximately in a mid-portion of the secondary frame 14 in a fore-and-aft sense, the rear actuator 24 plays an important contributory role in keeping the seed drum in a proper operating relationship to the ground, in which the drum is accurately maintained at a preascertained distance above the ground. The two sensory wheel-cam-sense valve assemblies are preferably mounted on respective brackets whose height relationship to the forward part of the secondary frame can be selectively adjusted, such as by a hand-rotated screw arrangement, in order that the discs of the assembly 70 will be caused to create furrows of a selected depth. Other height maintaining relationships will be discussed hereinafter.

Inasmuch as it is a goal of my invention to drop or actually project the tiny seeds downwardly from the seed drum directly into the respective furrows created by the disk assembly, there is opportunity for the seeds to undertake a degree of "bounce" if the furrows are dry. To that end, I provide a plurality of nozzles 80 following the disk assembly, with preferably three nozzles being associated with each furrow; note FIGS. 1 and 3. Water is thus supplied in considerable quantity so as to bring about a soaking of the furrows sufficient to prevent the seeds from tending to bounce or be deflected out of their proper furrows. Water for these nozzles is supplied from a manifold 82 (shown in FIGS. 1 and 3), that is in turn supplied with water pumped from a large tank 84 carried on forwardly extending structural members 85 located on the front of the vehicle, as best seen in FIG. 4.

The seed drum or perforate cylinder 86 extends substantially the full width of the subframe 14 at a location somewhat behind the nozzles 80, and is arranged to rotate in the direction of machine travel, but at a location spaced slightly above the ground, typically less than one inch. It will be noted in FIG. 3 that a sprocket 87 is provided at the end of the cylinder 86, and it is around a portion of this sprocket that the endless chain 76 passes, in order to provide power for the rotation of the cylinder at the desired number of revolutions per minute.

In accordance with an arrangement to be described in some detail hereinafter, a vacuum is maintained in the interior of the drum 86, enabling it to pick up seeds from a bin 88 coextensive with the drum, with the seeds being held at tiny holes located on the exterior of the drum. The tiny holes are spaced around the surface of the cylinder 86 in a series of encircling rows 90, with each encircling row of holes being in a plane that is parallel with the plane of each of the other encircling rows, and being in direct alignment with a given disk of the disk assembly 70. As the result of the novel seed release arrangement to be described in detail subsequently, the seeds are caused to be dropped at substantialy their lowermost point of travel, into respective furrows in very accurately spaced relationships. A typical spacing of the dropped seeds can be from seven-eighths of an inch to one inch, but I am not to be thus limited, and the spacing could be closer than the mentioned amount, or it could be made to be say two inches or more if such is desired.

A motor 100, typically a hydraulic motor, is revealed by FIG. 3 to be mounted on the frame 14, with this motor being equipped with a drive sprocket 102, around which a comparatively short endless chain 104 passes. Although a chain could be arranged to drive the disk unit 70 and the seed drum 86 directly, I prefer an arrangement of the type shown in FIG. 5 wherein the chain 104 brings about the rotation of a sprocket 106 mounted on a jack shaft 108. Also mounted on the jack shaft is a sprocket 110, around which the previously mentioned chain 76 passes, latter being considerably longer than chain 104.

Figure 5:
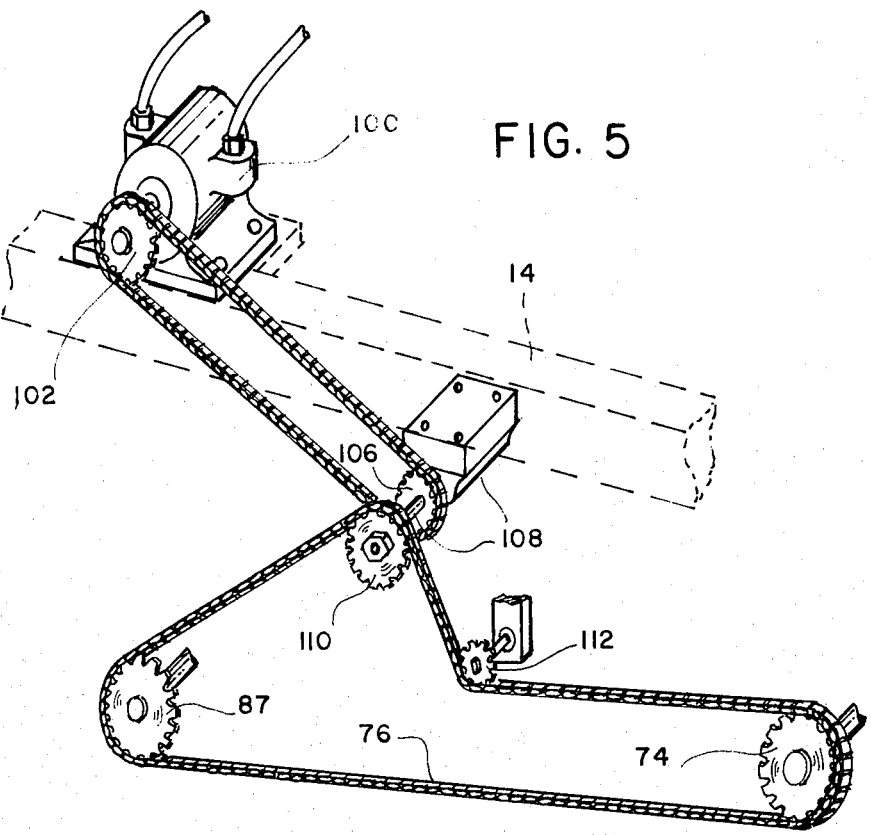
FIG. 5 is a fragmentary drawing to a large scale of the motor mounted on the subframe, which serves by means of a chain arrangement to drive the disk array and the seeder drum in rotation at the proper speed.

As will be apparent from FIG. 3 as well as FIG. 5, the motor 100 in driving the chain 104 powers the endless chain 76 that serves via sprocket 74 to cause the disk arrangement 70 to turn in a forward direction at a speed say three times ground speed. This of course more effectively digs the furrows into which the seeds are to be dropped, than would an arrangement in which fingers were used for creating the furrows, or in which disks are caused to rotate at a lesser speed. An idler sprocket 112 serves to maintain the chain 76 in a desired degree of tautness, and assures proper chain contact with the several sprockets.

The seed drum 86 typically does not rotate as fast as the disk unit, and its speed should be carefully regulated so as to cause the seeds to be dropped at intervals meeting the needs of the particular planting situation. It is important to size the sprockets 87 and 74 properly with respect to the drive sprocket 102, for the tooth relationships of these several sprockets quite obviously affects the spacing of the seeds, and determines the rotary speed of the disk unit. The rotational speed of the disk unit 70 is not nearly as critical as the rotational speed of the seed drum 86, so in the event it is desirable to change the spacing of the seeds, it is but a relatively simple matter to remove the drive sprocket 102, and replace it with a sprocket having a number of teeth commensurate with the desired spacing of the seeds in the furrows.

It is desirable to correlate the speed of rotation of the seed drum 86 with the speed of the propulsion wheels 16 and 18 over the ground, so as to assure an even spacing of seeds in the furrows, despite variations in vehicle speed. This is accomplished by utilizing a common hydraulic fluid supply for both the propulsion motors and for seed drum rotation, with the output of a hydraulic pump driven by engine 20 being first directed through the propulsion motors 17 and 19 (visible in FIG. 7) and thereafter through a flow divider, as described hereinafter in connection with FIG. 13. Because the flow divider diverts a fixed percentage, such as 25% of the total fluid flow through the motor 100 described in connection with FIGS. 3 and 5, latter motor rotates at a speed that bears a fixed relationship to the speed of motors 17 and 19. In this way it brings about a proportionate speedup of the drum 86 when the vehicle speed increases, and a proportionate speed decrease when the vehicle speed decreases, thus assuring a near constant seed spacing irrespective of the speed of the vehicle when operating within its working range. Further details of this arrangement will be set forth hereinafter.

Figure 6:
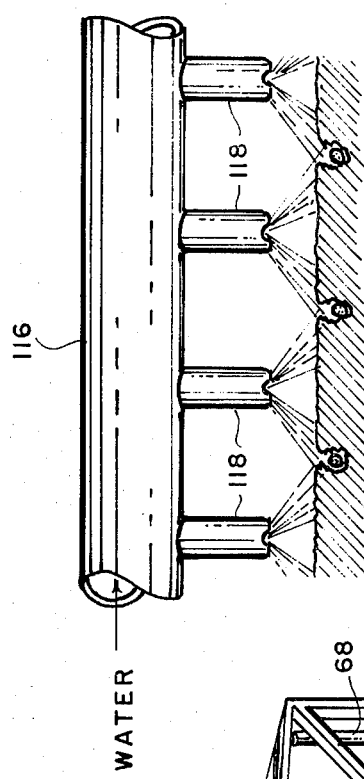
FIG. 6 is a view drawn to a large scale in order to illustrate water nozzles utilized immediately subsequent to the seed planting operation, with the spray pattern of the water being such as to bring about a type of seed covering operation.

As an adjunct to other arrangements that may be utilized for covering the newly planted seeds, I utilize a water manifold 116 behind the seed drum, with there being at least one nozzle 118 per furrow. Each nozzle is configured to have a spray pattern as shown in FIG 6, in which the streams or jets of water act upon the ridges or mounds of earth adjacent to the furrows, causing such earth to move and cover up the seeds. These sprays of water furthermore have an enhancing effect on the germination of the seeds.

An arrangement is utilized in accordance with this invention for maintaining the rear portion of the frame 14 in a proper relationship to the ground as will enable the seeds ejected from each circle of holes 90 on the seed drum 86 to properly enter the intended furrows. The previously-mentioned rear actuator 24 supported near a rear portion of the superstructure 30 is of course arranged to support the right and left rear corners of the frame 14 by the use of the chain 28, which is clearly depicted in FIGS. 2b, 3 and 4. In addition to the previously mentioned use of this actuator, it may also be used to bring about height corrections by an appropriate raising or lowering of chain 28, and correspondingly the raising or lowering of the rear portion of the frame 14, on a moment-to-moment basis. This action, in conjunction with the action of actuators 58 and 68, results in the seed drum being maintained at a proper spacing above the furrows. This is accomplished by the use of a ground height sensing arrangement 122, involving a series of sense fingers 124, mounted essentially on the centerline of the vehicle at a location behind the rear water manifold 116. These fingers are arranged to respond to any height changes of the ground at locations between th furrows: note FIGS. 2b and 3. The sense finger unit 122 is pivoted at 126, with a cam 128 being disposed on the other side of the pivot from the series of fingers.

The cam 128 is deliberately cut to have an active surface 130 disposed at a substantially constantly increasing radius, and a cam follower 132 in the form of a wheel is arranged to follow this surface of the cam, and to transmit changes of height resulting from cam rotation to sense valve 134. Hydraulic pressure ported by the sense valve 134 is supplied to the actuator 24, causing it to act in the manner of a leveling actuator, and in a direction consistent with the change in ground contour. This is to say, if the height of the rear part of the movable frame with respect to the ground appears to increase, the motion of the landed portion of the sense valve 134 will be caused to port fluid in a direction such that the rear actuator 24 lowers the rear part of the frame 14, whereas if the rear part of the movable frame appears to move nearer the ground, the movable portion of the actuator will correspondingly be caused to move upwardly as a result of cam rotation, thus to assure a relationship between the movable frame 14 and the ground appropriate for the dropping of seeds from the cylinder 86 into the furrows.

The rear water manifold arrangement 116 cannot always be relied upon to properly complete the covering over of the seeds that have just been planted, and to that end I utilize a rotary drum 140 of mesh construction, which drum is essentially coextensive with the width of the frame 14, and of a diameter similar to the diameter of the seed drum 86. The covering drum 140 is unpowered, and is supportd by arms 142 having elongate holes or slots 146 therein, which receive stub shafts 144 of the drum. The stub shaft 144 at each end of the seed covering roller 140 can have a considerable amount of motion in the vertically enlarged slot 146 of the respective arm 142, with the slots 146 being of sufficient length as to permit the roller 140 to be maintained at all times at a height appropriate to the unit. The covering drum is typically not biased downwardly, and its comparatively small weight and open mesh construction is such as to perform a highly effective job of covering the seeds.

Referring back to FIG. 4, it will be recalled that I prefer to use a vehicle arrangement in which the main chassis 12 supports the superstructure 30. This superstructure supported by a series of posts or columns 31, serves the primary purpose of providing an adequate support for the right and left leveling actuators 58 and 68 in the front of the machine, as well as the front lifting actuator 22 and the rear lifting actuator 24, but in addition, the superstructure serves at least one additional purpose in that it forms an adequate support for one or more awnings or tarpaulins that may be utilized to shield the operators from the sun and rain. These operators sit in seats 150, with one operator being primarily concerned with steering the unit, and the other being responsible for keeping the seed bin 88 filled, and the seeds dropping properly into the furrows.

FIG. 7 representing a view of the machine taken from above, reveals that the movable carrier frame 14 is preferably of rectangular shape, with the external dimensions of the movable carrier frame being such that it can be entirely accomodated within the open portion of the main frame 12. In this way, the height of the movable frame can be adjusted over a wide range, without interference from main frame portions.

Figure 8:
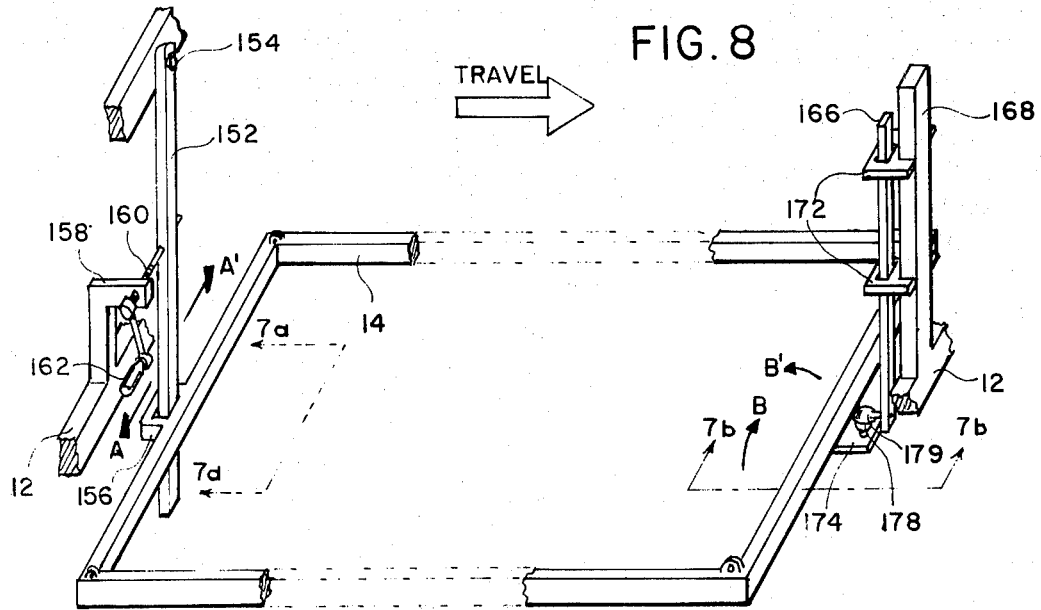
FIG. 8 is a fragmentary perspective view of the secondary frame, further revealing important details of the suspension and stabilization arrangement for the secondary frame.

As will be noted from this figure, as well as FIG. 8, I utilize an arrangement wherein guide arrangements are provided on the longitudinal centerline of the unit, at forward and rear portions of the subframe 14, with these arrangements being such that while the guide members do not interfere with vertical movements of the subframe brought about by energization of the front and rear lifting actuators, they nevertheless assure the proper spacing of the front and rear portions of the subframe 14 with respect to the main frame 12, so as to preserve the relationships depicted in FIG. 7.

As will be noted from FIGS. 7, 7a and 8, I utilize a stabilizing rod 152 near the rear end of frame 14, with the upper end of this rod being connected by pivotal means 154 to the superstructure 30. Rather than the lower end of this rod being connected to the subframe 14, I prefer to construct the rear portion of the subframe in the vicinity of its longitudinal centerline to define a somewhat enlarged, closed area 156 in which the lower end of rod 152 is movable to a slight extent.

At a location essentially midway between the upper pivotal connection 154 and the location where the rod 152 is adjacent to subframe, I provide a rod contacting means 158 in the form of a screw threaded member 160 turned by a hand crank 162. By this means, the person seated adjacent to the driver, on a moment-by-moment basis, can selectively manipulate the hand crank to cause left or right movements of the lower end of the rod 152, and thereby bring about corrective left and right movements of the subframe 14 with respect to the main frame 12. This arrangement is provided inasmuch as problems from time to time arise with respect to the seeds not dropping properly into the furrows, these problems resulting from the driver finding it necessary to make steering type corrections with the front wheels of the machine. Such steering corrections necessarily bring about a degree of lateral movement of the midportion of the main and subframes, and are of such a nature as to go unnoticed in most forms of wheeled vehicles. However, in a seeder of the type described herein, the steering movements of the front wheels 16 have a quite noticeable and often adverse effect upon the dropping of the seeds accurately into the furrows, and to that end I prefer to provide the hand crank arrangement described above.

At the front part of the subframe 14, an entirely different stabilizing arrangement is utilized, for I there prefer to use a vertically slidable rod 166 pivotally attached to the front of the subframe 14, with this rod being adjacent and generally parallel to guide rod 168 rigidly mounted on the main frame 12. As will be noted from a study of FIGS. 7, 7b and 8, a pair of spaced collars 172 are welded or otherwise secured on member 168, with these collars each defining a hole in which the rod 166 is freely slidable.

The lower end of the stabilizing rod 166 is secured to the subframe 14 by a form of ball and socket joint, much in the nature of a typical tie-rod end utilized in many automobiles. As will be seen in FIG. 7b, a plate 174 is welded on the underside of frame 14 at its centerline location, with this plate having a hole drilled through its forward portion to receive a bolt 176 associated with the ball 178. By placing a large nut 180 on this bolt, the ball can be secured tightly in place on the plate 174.

Mating with the ball 178 is a socket member 179, which is mounted upon a horizontally disposed bolt 182 inserted through a horizontally disposed hole located near the bottom of the stabilizing rod 166, and secured therein by a nut 184.

As should now be apparent, this arrangement forms adequate stabilization for the front end of the subframe, and inasmuch as it involves only a single point, it offers no significant resistance to the efforts of the right and left leveling actuators in maintaining proper spacing with respect to the ground, of the components carried by subframe 14.

Turning now to FIG. 9 and figures related thereto, the rotary seed drum 86 has been shown in succh a manner as to reveal a number of encircling rows 90 of tiny, spaced holes 91. The number and spacing of the rows of holes 90 on the rotatable cylinder 86 corresponds to the number and spacing of the disks of the assembly 70, so that the seeds dropped from the bottom of the cylinder can fall directly into respective furrows created by the disk array. By creating a vacuum inside the cylinder 86 with respect to a considerable circumferential extent of the encircling rows, each of the tiny holes 91 can be caused during drum rotation to pick up a seed from the adjacent seed bin 88, which bin extends along the length of the cylinder 86, as previously mentioned.

The reduced pressure inside cylinder 86 is created by providing an axial member 92, which is connectd to a vacuum pump (not shown) mounted on the main frame. A hole 93 in member 92 connects this member to the interior of the cylinder. The reduced pressure in cylinder 86 causes seeds to be taken from the bin, with a single seed to be held against each hole location on the exterior of the cylinder 86. Then, as the cylinder rotates, the seeds are carried over the top of the cylinder, and thereafter deposited in a carefully spaced manner in respective furrows. The pressure in cylinder 86 may for example be one and one-half pounds below atmospheric.

To obviate the tendency for more than one seed to be picked up at a single hole, I provide a series of blower tubes 94 mounted in spaced relation adjacent an upper portion of the seed drum, these being fed from a compressed air header 95 connected to an air pump (not shown) mounted on the main frame. The pressure of this air may be one and one-half pounds above atmospheric. The blower tube details are visible in FIGS. 1 and 3, but the drum-blower tube relationship is perhaps best seen in FIG. 10. The spacing of the tubes 94 coincides with the spacing of the encircling rows 90, and the tube outlets are spaced comparatively close to the surface of the cylinder 86. The outward flow of compressed air from the tubes does not affect seeds properly seated in the holes 91, but it effectively serves to dislodge any extra seeds, referred to as "doubles", that were being carried by a single hole location. The compressed air tends to carry the dislodged extra seeds back to the seed bin 88.

At the proper rotative location, typically in a position low on the cylinder as shown in FIGS. 9 through 11, the vacuum condition holding the seeds in place on the surface of the cylinder 86 is broken, causing each individual seed of each encircling row of seeds to be released into the respective furrow in an evenly spaced relationship. Typically, the holes 91 of the encircling rows 90 line up longitudinally, so that a seed will be dropped essentially simultaneously from the lowest point of each encircling row 90. However, there is no rigid requirement for a longitudinal alignment of the holes 91.

FIGS. 10 and 11 each reveal a portion of the cylinder 86 in cross section, illustrating how seeds are held in place at the locations of the spaced holes 91, but then released at the correct rotative location in order that each seed will in turn enter the intended furrow. That this may be accomplished, I use, as revealed in these figures, a seed release arrangement utilizing a pressure tube assembly 186 that is associated with the lower portion of each encircling row of holes, which causes a local cessation of the reduced pressure condition, such that each successive seed will drop at the most apt location in order to enter the respective furrow.

With regard to further details of the seed release arrangement, FIGS. 9 and 11 reveal that the pressure tube arrangement includes a header 188 extending for substantially the entire longitudinal extent of the interior of the perforate cyliner 86, being disposed for example at the location revealed in FIG. 9, wherein it is coincident with the axis of rotation of the cylinder. It may be desirable for the vacuum supply tube 92 and the pressure header 188 to be constructed from a common tube or pipe, in which event a tightly fitting plug or barrier 189 may be utilized, as shown in FIG. 12, to prevent flow of pressure from the pressure side into the vacuum side.

Although, as previously mentioned, a reduced pressure exists generally inside the cylinder 86, a positive pressure, such as two pounds above atmospheric, exists in the header 188, which pressure is manifested into each of the pressure tube assemblies 186. As shown in FIG. 9, these tube members extend downwardly from the header at intervals corresponding to the spacing of the encircling rows 90, which tube members each carry positive pressure to the interior side of each respective encircling row 90, causing the detachment of the seeds at appropriate, preselected times in order for them to each enter the furrow directly below.

Reference to FIG. 11 reveals that each pressure tube assembly 186 is made up of a body member 190 that is screw threaded into the header 188 at a location spaced from other tube openings. Each body member has an orifice 192 of preestablished size, through which the compressed air contained in the header 188 is permitted to flow at a preascertained rate.

Disposed on the interior of the tube body 190 is a tube holder 194, with the tube holder retained in the tube body 190 by means of an o-ring 196. Disposed inside the tube holder is a blower tube or plunger 198, which is of a length sufficient to contact the interior sidewall of the perforate cylinder 86, and which carries sufficient air through its interior as to dislodge the seed from the exterior of each hole 91 passing by the outermost end of the blower tube as the cylinder rotates. This occurs in what may be regarded as a timed relationship. The outer end of each blower tube or plunger 198 makes a desirable amount of contact with the interior of the cylinder 86 and with the holes 91 therein as a result of the placement of a compression spring 200 in the tube holder at a location above the blower tube, which of course biases the blower tube toward the inner periphery of the peforate cylinder 86 with a force that minimizes undesirable leakage. A cup 202 such as of rubber is utilized on the upper end of the plunger 198, and it fits upon a male extension of latter member that is of somewhat diminished diameter.

The rubber cup 202 serves as a washer in the manner of a cup washer used in a hand operated tire pump, and it serves to minimize if not eliminate leakage between members 194 and 198. As should be obvious, the inner surface of the drum 86 serves as a retainer by contacting the lowermost tip of each blower tube 198, for it keeps these tubes from being possibly forced out of proper operating position by the combined efforts of the spring 200 and air pressure.

As mentioned hereinbefore, I am not to be limited to the use of hydraulics, such as to hydraulic actuators utilized in conjunction with the lifting or lowering of the secondary frame 14 with respect to the main frame, or in conjunction with the sensor arrangement such that the secondary frame can be maintained in the proper operating relationship to a seedbed, irrespective of changes in ground contour. Likewise, I am not to be limited to a hydraulic drive arrangement for propelling the vehicle 10 over the ground, and for driving the disk array 70 and the perforate drum 86 in rotation. Nevertheless, I prefer to utilize an all hydraulic arrangement for reasons of dependability, accuracy and practicality.

Figure 13:
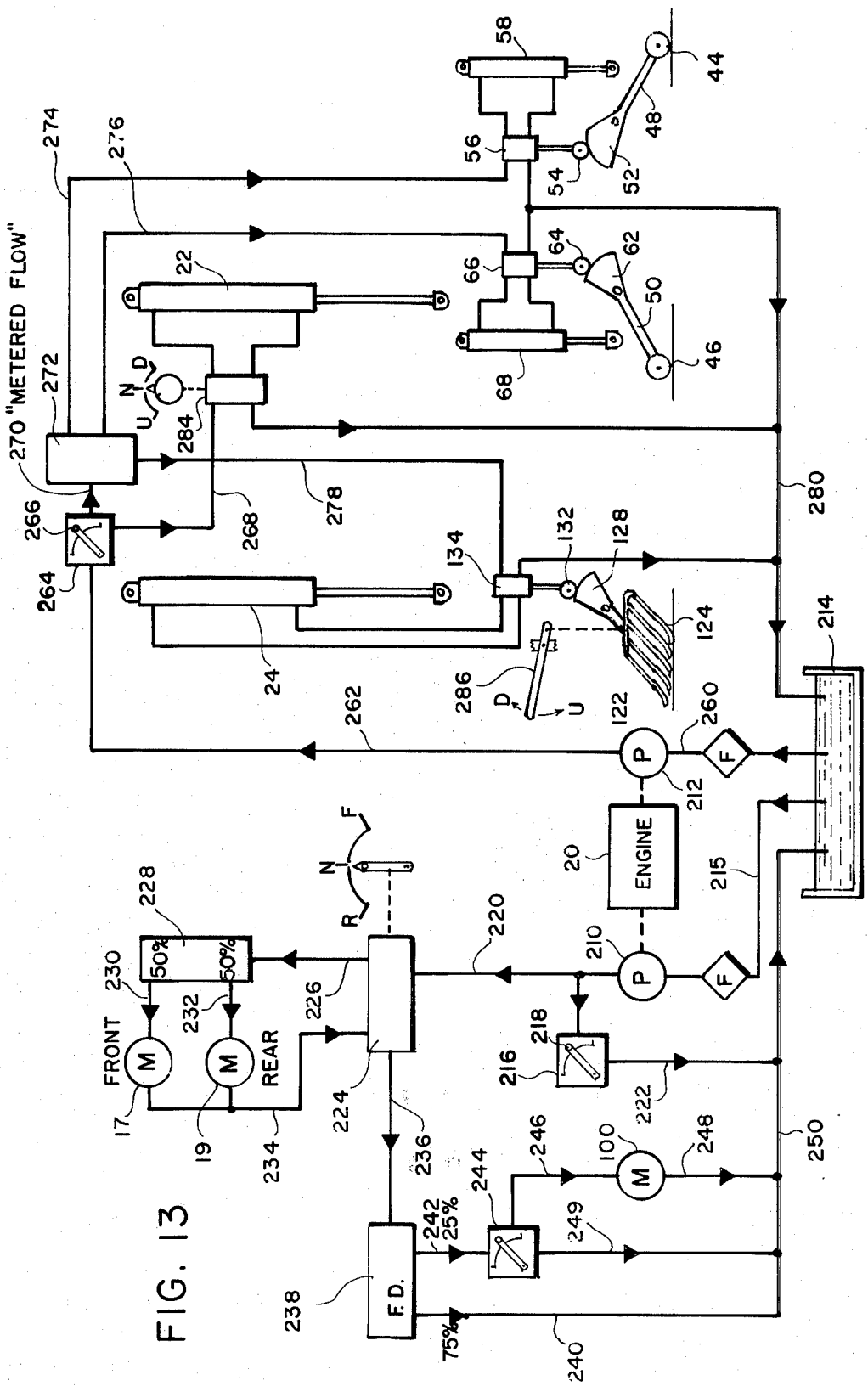
FIG. 13 is a hydraulic diagram revealing how a first engine driven pump provides hydraulic pressure for propulsion of the seeder vehicle and for driving the seeder drum, and how a second pump provides hydraulic pressure for operation of the various sensor units and the associated actuators.

Turning to FIG. 13, I have there provided a hydraulic flow diagram or schematic depicting the various operational components of my device, and how they would operate in a typical all hydraulic arrangement. The engine 20 is illustrated in this figure as driving two pumps, 210 and 212, but in reality it also drives an additional pump (not shown) concerned with driving a water pump for the use with the spray arrangements, two pumps concerned with providing air pressure, and a vacuum pump. Pump 210 is concerned with providing hydraulic fluid in appropriate quantities and at a pressure such as 1200 psi to the hydraulic motors 17 and 19, which are arranged to drive the front wheels and rear wheels respectively, of the vehicle. This same fluid is also delivered to the motor 100 arranged to drive disk assembly 70 and the seed drum 86. Pump 210 may for example be by Hydreco, Model 19 P-190.

Pump 212 is concerned with providing flow to actuators 22, 24, 58 and 68 responsible for maintaining carrier frame 14 in a desired relationship to the ground. Pump 212 may also be by Hydreco, Model 13 P-190. Each of these pumps draws hydraulic fluid from a tank or reservoir 214, with suitable return lines being utilized in connection with the propulsion and seed dispersing operations, and with the actuators, such that fluid is returned to the tank 214 for continued reuse.

Discussing now the propulsion and the seed dispersal arrangements in greater detail, it will be noted that the pump 210 draws fluid from tank 214 by means of tube or conduit 215. This fluid passes through an appropriate filter means F, and is then delivered to flow control 216.

This latter device for example may be Brand, Model FC 51, with one side of the device plugged. Flow control 216 has an operating lever 218 that can be manipulated by the operator, with movements of the lever determining how many gallons of pressurized hydraulic fluid per minute enter fluid line 220, to then drive the propulsion motors 17 and 19. The fluid caused by the positioning of operating lever 218 not to enter line 220 passes into line 222, which line serves to redeliver the fluid to the tank or reservoir 214. It is therefore to be seen that by manipulating the speed control lever 218 to increase the quantity of fluid passing through line 220, the operator increases the speed of the vehicle over the ground, whereas by moving the lever in the opposite direction, he increases the quantity of fluid being bypassed back to the tank, which of course brings about a decrease in vehicle speed. Typically, the engine 20 runs continuously at a suitable fixed speed, which may for example be 1500 rpm.

Fluid is delivered by line 220 to a three position valve 224, which is a drive control valve such as a Gressen SPK valve. This valve has three positions, forward, neutral and reverse, with the operator's positioning of this valve of course determining whether the vehicle moves forward, stops, or moves in reverse. Fluid leaving this valve via fluid line 226 enters a flow divider 228, such as a Delta P 27 device concerned with providing one-half of its output into a first fluid line and the other one-half of its output into a second fluid line. In this instance, one-half of the output flow enters line 230 that is connected to drive forward motor 17 in rotation, and the other one-half of the fluid enters fluid line 232 concerned with driving the rear motor 19 in rotation. These motors are depicted in FIG. 7, and it may be seen in latter figure that these motors are connected by suitable gears or chains to cause the driving of the forward and rear wheels of the vehicle.

Fluid leaving the motors 17 and 19 enters conduit 234, which serves to carry return fluid back through a part of valve 224, from which it then enters fluid line 236.

It has been mentioned hereinbefore that it is desirable to utilize the fluid first used for driving the propulsion motors for thereafter causing the rotation of the hydraulic motor 100 concerned with creating furrows in the seed bed, and more importantly, for also bringing about the rotation of the seed drum 86. The reason for this arrangement is that it is desirable to eliminate speed fluctuations of the vehicle over the seedbed as a consequential variable insofar as seed spacing is concerned. To that end, I connect conduit 236 to a flow divider 238, which diverts say 75% of the flow from the propulsion motors into line 240 leading back to the return line 250, with the remaining 25% of the flow then entering conduit 242 to be utilized for driving the seeder drive motor 100. Conduit 242 is connected to a flow control valve 244, such as a Brand FC-51, with this control making it possible for the operator to have complete control over the starting and stopping of the disk array and the seeder drum. As is apparent from FIG. 13, fluid entering conduit 246 then flows through the motor 100, which motor may for example be an Orbit P motor. The fluid leaving this motor travels through conduit 248 and enters return conduit 250. As is obvious, the more fluid the operator diverts into bypass line 249 by manipulation of valve 244, the less the speed of motor 100. Upon the valve 244 being set for an appropriate seed spacing, typically when the valve is at or near a wide open condition, it is not moved again until a specific change is desired.

There are instances in which the operator may wish to operate the drum at a low speed, such as when he needs to clean drum openings, in which case he increases the amount of fluid bypassed into line 249.

The right hand side of FIG. 13 is concerned with providing a suitable flow of pressurized hydraulic fluid for proper operation of the sensor units concerned with keeping the secondary or carrier frame 14 in what may be regarded as a level condition. By level condition I mean the frame 14 residing in such a relationship to the seed bed that the disk array is able to create furrows typically on the order of 3/16 of an inch deep, and the lowermost portion of the seeder drum operates approximately one-half inch above the ridged portion existing between each two adjacent furrows of the seed bed. When the disk array and the seeder drum are spaced in this manner, the longitudinally disposed structural members of the secondary frame are usually horizontally disposed or at least essentially so.

The pump 212, which may be a Hydreco, Model 13 P-190, draws fluid through conduit 260 from the reservoir or tank 214, with this fluid of course passing through an initial filter F. Thereafter, the pressurized fluid passes into a conduit 262 and then enters a flow control valve 264, such as a Brand FC-51.

Lever 266 of valve 264 enables the operator to have careful control over the amount of pressurized hydraulic fluid flowing through conduit 270 to the flow divider 272, and how much is bypassed into conduit 268 leading to the lifting actuator 22. The flow divider 272, preferably by Delta, serves to proportion the flow of hydraulic fluid into a conduit 274 connected to sense valve 56 associated with right hand leveling actuator 58; to a conduit 276 connected to sense valve 66 associated with left hand leveling actuator 68; and to a conduit 278 connected to sense valve 134 associated with rear actuator 24. Typically the proportioning is in equal amounts.

The operator normally adjusts the lever 266 until a sufficient amount of fluid is being proportioned by the flow divider as to assure proper operation of the sensor units. Then, the lever 266 is left in that position, with further adjustment usually not being necessary. I have found after diverting the principal flow into conduit 270, that sufficient fluid is still being delivered via bypass line 268 as will enable proper functioning of the actuator 22 at the behest of the operator.

As shown in this part of FIG. 13, a return line is associated with each of the sense valves 56, 66 and 134 such that fluid subsequent to utilization may be carried to conduit 280 leading back to the tank 214.

Each of the three sense valves is connected by a pair of conduits to the upper and lower ends of the respective hydraulic actuators, with the sense valves being capable of porting pressurized fluid to one end or the other of such actuator. Upon say an upward change of ground contour, the cam follower associated with the sense valve is caused to move upwardly, thus causing hydraulic fluid to be directed so as to cause the piston of the associated actuator to move upwardly, and thus bring about the lifting of its portion of the frame 14. On the other hand, upon the cam follower being lowered as a result of cam rotation in the opposite direction, the piston of that actuator is caused to move in the opposite direction, and lower that portion of the secondary frame.

As should now be apparent, upon the sensor wheel 44 or 46 moving downwardly, the respective cam moves to permit the associated cam follower to lower, and thereby bring about the lowering of that corner of the secondary frame. It should be noted that the single point suspension at the forward central portion of the secondary frame enables relatively unhindered leveling type movements by a single actuator. However, I have found that most ground contour changes are such that the leveling actuators move upwardly or downwardly essentially together.

Somewhat similarly, the tines 124 follow between the furrows, as shown in FIG. 2b, with movements of its cam 128 causing movements of the cam follower 132 and the sense valve 134 so as to bring about appropriate movements of the piston of actuator 24 that will result in the rear end of secondary frame 14 being maintained in a proper relationship to the ground.

As is obvious, the disk array 70 and the perforate seed drum 86 must be lifted away from the seed bed when the end of a bed is reached. These components are then maintained in a raised condition while the vehicle turns around, and it is not until the front and rear wheels are again straddling the next seedbed that the operator again lowers the secondary frame, to place the disk array, seed drum, and other components in operational condition.

The actuator 22, which is concerned only with a lifting function, and not with a leveling function, is manually actuated by the operator, utilizing a switch or lever 284. Manipulations of this lever causes pressurized fluid to enter either the bottom or the top of this actuator, to bring about either the lifting of the forward part of the frame, or the lowering of same. Upon being lowered, contact by the sensor wheels 44 and 46 with the ground quickly brings about the restoration of the leveling capability, causing this part of the frame to resume the proper operating position.

The raising and lowering of the rear portion of the frame becomes more complex, this being because the actuator 24, as previously mentioned, serves both a leveling function as well as a lifting function. When the operator desires to lift the rear end of the frame 14, which is almost always in concert with the lifting of the forward part of the frame, he manipulates a lever 286 in the direction to cause the tines or fingers 124 to be moved away from contact with the seeded. This serves to cause the associated cam 128 to move the cam follower 132 in such a direction as to bring about the sense valve 134 causing the actuator 24 to raise the rear end of the secondary frame an appropriate amount. The rear end of the frame remains in the raised position until such time as the operator moves the lever 286 in the opposite direction, so as to bring about a lowering of the rear sensing device, by the cable or chain 287, such that the fingers 124 again seek the desired operating relationship with the furrows. In this way the automatic leveling function with respect to the rear of the secondary frame is caused to resume.

As mentioned above, an additional, non-illustrated hydraulic pump driven by the engine 20 serves to provide pressurized hydraulic fluid for driving a water pump (not shown), with this pump being concerned with providing water to the nozzles 80 as well as the nozzles 118. In addition, this third hydraulic pump provides pressurized fluid for driving two air pumps, one concerned with providing air to header 95, and the other providing air to the central tube or header 188 of the rotary drum 86. An additional pump does not provide air pressure, but rather is connected so as to provide a vacuum to axial member 92 concerned with lowering the pressure inside the drum 86. None of these have been illustrated because of their obvious nature. As to steering, a power steering arrangement is preferred, which preferably is connected to partake of pressurized fluid in line 268 connected between flow control valve 264 and the arrangement for lifting the front of frame 14.

As should now be apparent, I have set forth herein a precision seeder device utilizing a seed dispersing arrangement that is operationally effective for projecting tiny seeds into seedbeds at carefully spaced intervals. Although this device could be used in connection with seedbeds having pre-prepared furrows, my device typically takes the form of a machine employing a rotatable disk unit located at a forward portion of the machine, with the disks of this array serving to create a series of parallel furrows of consistent depth.

Because in accordance with this invention, the seed dispersing means preferably takes the form of a rotatable cylinder, from the periphery of which seeds are projected directly into the furrows, I am able to avoid the tubes and conduits used in accordance with the prior art for supposedly guiding the seeds to the furrows, but which means frequently dropped the seeds at uneven intervals, and even more frequently caused seeds to reside too close together. Upon this latter taking place, undersized plants resulted.

Because in accordance with this invention, the seeds are projected only a short distance, usually traveling less than one inch, it is desirable to have the seed dropping cylinder maintained at a carefully controlled distance above the furrows. For the combined reasons of desiring furrows of precise depth and wishing to maintain this carefully spaced distance, I mount the disk array and the seed drum on a secondary frame whose height above the seed bed can be precisely controlled on a moment-by-moment basis, and maintained in a level condition. Suitable sensor means and accompanying actuator means automatically enable the accurate maintaining of the secondary frame in a level condition above the ground.

Seed bounce, which would result in less than precise spacing of the seeds, is effectively prevented in accordance with this invention by a self-contained spray arrangement carried on the vehicle behind the disk array, but in front of the seed drum, serves to further wet the furrows and aid in covering the seeds, but with a following rotatable drum serving to complete the planting operation.

Although, as mentioned hereinbefore, my seeder is specifically designed to accomplish a consistent spacing of seeds in each of a large number of parallel furrows, irrespective of fluctuations in the ground speed of the vehicle, if the operator desires to accomplish a specific change in seed spacing, this can be brought about by changing the drive arrangement for the seed dispersing means, typically by changing the sprocket 102 to a sprocket having a different number of teeth.

Should the operator desire to change the depth of the furrows being created by the rotary furrow-creating means 70, this may be accomplished by raising or lowering the disk array with respect to the rest of the carrier frame 14. However, I preferably change furrow depth, when needed, by modifying the height relationship to the secondary frame 14, of the two forward assemblies involving sensory wheel — cam — sense valve. This is easily accomplished by adjusting the brackets by which these assemblies are mounted upon the secondary frame 14, thus to bring about these automatic height maintaining devices operating in a different height relationship to the secondary frame. These adjustments of the forward sensor arrangements may in some instances be in non-equal amounts, such as when the operator is striving to establish an equal depth of all the furrows being created.

I claim:

1. A precision planting device for planting seeds in seedbeds, comprising a vehicle carrying seed dispersing means, said seed dispersing means being in the form of a power driven, perforate rotary drum operationally disposed a short, preascertained distance above a seedbed, such preascertained distance ordinarily being a small fraction of a foot, servo means for automatically maintaining the lowest portion of said rotary drum at such preascertained distance on a moment-by-moment basis, and means for causing said rotary drum to release seeds from its periphery at precisely controlled, equal intervals directly into the seedbed.

2. The precision planting device as defined in claim 1 in which said seed dispersing means is carried on a secondary frame of said vehicle, sensing means operatively associated with said secondary frame, means supporting said sensing means in such a position that said sensing means maintains ground contact, said sensing means controlling actuators that support said secondary frame, such that said seed dispersing means will be accurately maintained at such preascertained distance.

3. The precision planting device as defined in claim 2 in which said secondary frame carries furrow-creating means at a location forward of said seed dispersing means, said furrow-creating means functioning to simultaneously create a plurality of spaced furrows, said furrow-creating means and said seed dispersing means being in longitudinal alignment, the seeds dispersed by said seed dispersing means therefore entering respective furrows created by said furrow-creating means.

4. The precision planting device as defined in claim 3 in which spray means are located on said secondary frame following said furrow-creating means but prior to said seed dispersing means, said spray means serving to wet such furrows so as to prevent bounce of the seeds released from said seed dispersing means.

5. The precision planting device as defined in claim 1 in which said seed dispersing means is carried on a secondary frame of said vehicle, and a furrow-creating means is carried at a location on said secondary frame that is forward of said seed dispersing means, said furrow-creating means functioning to simultaneously create a plurality of spaced furrows, said furrow-creating means and said seed dispersing means being in longitudinal alignment such that seeds dispersed by said seed dispersing means enter respective furrows previously created by said furrow-creating means, sensing means carried on said secondary frame and supported in such a position as to maintain ground contact, said sensing means controlling actuators utilized in the support of said secondary frame, such that as a result of the cooperative effort of said sensing means and said actuators, said furrow-creating means will automatically create furrows of consistent depth, and said seed dispersing means will be accurately and automatically maintained at such preascertained distance.

6. The precision planting device as defined in claim 5 in which spray means are located on said secondary frame following said furrow-creating means, but preceding said seed dispersing means, said spray means serving to wet such furrows so as to prevent bounce of the seeds released from said seed dispersing means.

7. A precision planting device for planting seeds in seedbeds, comprising a vehicle having wheels arranged to straddle a seedbed, which vehicle forms the support for a rotatable seed drum, the periphery of which drum contains a large number of tiny holes, seed supply means adjacent said seed drum, means for maintaining a lowered pressure inside said drum, thus to cause seeds encountered by the outer surface of said drum to be releasably held at the hole locations, means for maintaining said seed drum at a relatively constant speed of rotation, means maintaining said seed drum at a preascertained distance above such seedbed, latter means including sensing means and servo means operative to maintain the lowermost part of said seed drum at a location spaced a consistently close distance from the seedbed, despite irregularities of seedbed contour, and means for causing a localized cessation of lowered pressure in said drum each time, as a result of drum rotation, seeds reach essentially the lowest point of travel on said drum, with the result that seeds are dispersed at even intervals directly into the seedbed from the periphery of said drum.

8. The precision planting device as defined in claim 7 in which a hydraulic motor drives said seed drum in rotation, and a different hydraulic motor provides propulsion for said vehicle, means for delivering to the motor concerned with seed drum rotation, a preascertained, constant proportion of the hydraulic fluid passing through the propulsion motor, thus assuring commensurate increases or decreases in the rotational speed of said seed drum with increases or decreases in vehicle speed, and thereby assuring an even speed spacing in the furrows irrespective of speed fluctuations of the vehicle over the ground when operating within its intended operating range.

9. The precision planting device as defined in claim 7 in which said rotatable seed drum is mounted upon a secondary frame, with said secondary frame being supported from the main frame of the vehicle by actuators of adjustable length, and automatic means for energizing said actuators on a moment-by-moment basis to cause appropriate vertical movement of said secondary frame, as will maintain said seed drum at the preascertained distance above the seedbed.

10. The precision planting device as defined in claim 9 in which a rotatable disk array is rotatably supported at a forward position on said secondary frame, the disks of said array serving to create a series of essentially parallel furrows, the tiny holes in said seed drum being grouped into numerous encircling rows, each one of which rows is aligned with a disk of said rotatable disk array, thus assuring the dropping of seeds from each encircling row of holes of said seed drum into respective furrows.

11. The precision planting device as defined in claim 7 in which said seed drum is carried on a secondary frame of said vehicle, sensing means operatively associated with said secondary frame, means supporting said sensing means in such a position that said sensing means maintains ground contact, said sensing means controlling actuators that support said secondary frame, such that the lowest portion of said seed drum will be accurately maintained at such preascertained distance above the seedbed.

12. The precision planting device as defined in claim 11 in which said secondary frame carries furrow-creating means at a location forward of said seed drum, said furrow-creating means functioning to simultaneously create a plurality of spaced furrows, said furrow-creating means and encircling rows of holes in said seed drum being in longitudinal alignment the seeds dispersed by said seed drum therefore entering respective furrows created by said furrow-creating means.

13. The precision planting device as defined in claim 12 in which spray means are located on said secondary frame following said furrow-creating means but prior to said seed drum, said spray means serving to wet such furrows so as to prevent bounce of the seeds dispersed from said seed drum.

14. The precision planting device as defined in claim 7 in which said seed drum is carried on a secondary frame of said vehicle, and a furrow-creating means is carried at a location on said secondary frame that is forward of said seed drum, said furrow-creating frame functioning to simultaneously create a plurality of spaced furrows, the tiny holes of said seed drum being arrayed in a series of encircling rows, with each row being aligned with a respective furrow, such that seeds dispersed by said seed drum enter such respective furrows, sensing means carried on said secondary frame, means supporting said sensing means in such a position that said sensing means maintains ground contact, said sensing means controlling actuators utilized in the support of said secondary frame, such that said furrow-creating means will automatically create furrows of consistent depth, and said seed drum will be accurately and automatically maintained at such preascertained distance above the seedbed.

15. The precision planting device as defined in claim 14 in which spray means are located on said secondary frame following said furrow-creating means, but preceding said seed drum, said spray means serving to wet such furrows so as to prevent bounce of the seeds released from said drum.

16. An automatic seeder for planting tiny seeds at a consistent depth and at evenly spaced intervals, comprising a wheeled main frame, and a secondary frame carried by the main frame, a rotatable disk array, utilizing a plurality of disks disposed at spaced intervals, being rotatably mounted on a forward portion of said secondary frame, with such rotatable disks serving to engage the ground and create parallel furrows of consistent depth, spray means disposed adjacent said disk array and serving to wet down such furrows, a perforate rotary drum carried by said secondary frame essentially parallel to said rotatable disk array, with said perforate drum disposed just above ground level, and means for rotating said drum in the direction of travel at essentially ground speed of the wheeled main frame, said perforate drum having a large number of tiny hols disposed in a series of evenly spaced encircling rows with each of such rows being in alignment with a disk of said rotatable disk array, seed-supplying means adjacent said drum, means for maintaining a low pressure relative to ambient atmospheric pressure inside said drum, such that encountered seeds will be maintained on the surface of said drum at the locations of said tiny holes, and means for selectively breaking the low pressure condition at a lower interior location in said drum such that seeds retained on the surface of the drum will fall away from the drum when reaching essentially the lowermost point of travel, and thus travel directly into respective furrows.

17. The automatic seeder as defined in claim 16 in which ground-sensing means are operatively associated with said secondary frame, said ground-sensing means functioning to ascertain the depth at which said rotatable disk array is operating, as well as the height above ground of said perforate drum, and actuator means functioning to support said secondary frame, said actuator means being controlled by signals from said sensing means such that height changes of such secondary frame as well as of the disks and drum carried thereby are readily brought about, thereby assuring that furrows of consistent depth are created, and that said drum maintains a preascertained operating height.

18. The automatic seeder as defined in claim 16 in which actuator means are utilized for supporting said secondary frame from said main frame at selected heights, and sensing means are employed at forward locations on said secondary frame, for sensing ground contours thereunder, said actuator means being energized by signals from said sensing means, said actuator means thus functioning to raise or to lower said secondary frame on a moment-to-moment basis in order to automatically maintain a desired relationship of said rotatable disk array with respect to the ground, such that furrows of a desired depth are created.

19. The automatic seeder as defined in claim 18 in which said sensing means are adjustably mounted upon said secondary frame, with height adjustments of said sensing means enabling said secondary frame to maintain a modified relationship with respect to the ground, and thereby cause furrows of a different depth to be created.

20. The precision planting device as defined in claim 16 in which spray means are located on said secondary frame following said disk array, to wet the furrows so as to prevent bounce of the seeds released from said perforate drum.

21. The automatic seeder as defined in claim 16 in which a hydraulic motor drives said perforate drum in rotation, and a different hydraulic motor provides propulsion for said seeder, means for delivering to the motor concerned with drum rotation, a preascertained, constant proportion of the hydraulic fluid passing through the propulsion motor, thus assuring commensurate increases or decreases in the rotational speed of said perforate drum with increases or decreases in seeder speed, and thereby assuring an even seed spacing in the furrows, irrespective of speed fluctuations of the seeder over the ground when operating within its intended operating range.

22. The automatic seeder as defined in claim 21 in which the first mentioned hydraulic motor drives a chain sprocket around which a drive chain is operatively disposed, said drive chain serving to drive said perforate drum in rotation, and means for changing the speed of rotation of said perforate drum, including an exchange of said chain sprocket for one having a different number of teeth.

23. The automatic seeder as defined in claim 21 including hydraulic control means utilized in the fluid line carrying pressurized fluid to the hydraulic motor concerned with driving said perforate drum in rotation, said hydraulic control means enabling an operator to selectively change the speed of rotation of said drum by altering the fluid flow to said motor.

24. The automatic seeder as defined in claim 23 in which said hydraulic control means has a selectively operational position, at which position said perforate drum is caused to stop rotating.

25. The automatic seeder as defined in claim 16 in which said means for selectively breaking the low pressure condition at a lower interior location of said drum is constituted by a structural arrangement in which pressure greater than atmospheric is utilized, thus causing seeds to be projected into respective furrows with some degree of force.

26. The automatic seeder as defined in claim 25 including a spray utilized subsequent to the seed implanting, which serves to aid the covering over of the seeds with earth.

27. The automatic seeder as defined in claim 26 in which said spray concerned with covering the seeds is followed by a rotary covering drum serving to complete the covering over of the seeds with earth.

28. The automatic seeder as defined in claim 16 including mechanical adjustment means utilized for controlling the lateral relationship between said main frame and said secondary frame, such that each encircling row of holes on said perforate rotary drum can be maintained in proper alignment with the respective furrow created by said disk array.

* * * * *